US010240413B2

(12) United States Patent
Zhao et al.

(10) Patent No.: US 10,240,413 B2
(45) Date of Patent: Mar. 26, 2019

(54) NON-CONTACT FLOW RATE MEASUREMENT OF FLUID USING SURFACE FEATURE IMAGE ANALYSIS

(71) Applicant: Halliburton Energy Services, Inc., Houston, TX (US)

(72) Inventors: Liang Zhao, Plano, TX (US); Michael L. Fripp, Carrollton, TX (US); Thomas J. Frosell, Irving, TX (US); Zachary R. Murphree, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 293 days.

(21) Appl. No.: 15/101,534

(22) PCT Filed: Feb. 19, 2014

(86) PCT No.: PCT/US2014/017186
§ 371 (c)(1),
(2) Date: Jun. 3, 2016

(87) PCT Pub. No.: WO2015/126387
PCT Pub. Date: Aug. 27, 2015

(65) Prior Publication Data
US 2016/0312553 A1 Oct. 27, 2016

(51) Int. Cl.
*E21B 47/10* (2012.01)
*G01F 1/00* (2006.01)
(Continued)

(52) U.S. Cl.
CPC .............. *E21B 21/08* (2013.01); *E21B 47/10* (2013.01); *E21B 47/102* (2013.01); *G01F 1/00* (2013.01); *G01F 1/661* (2013.01)

(58) Field of Classification Search
None
See application file for complete search history.

(56) References Cited

U.S. PATENT DOCUMENTS

| 6,847,034 B2 * | 1/2005 | Shah ...................... E21B 23/08 |
| | | 166/250.01 |
| 7,227,621 B2 | 6/2007 | Lee et al. |
| (Continued) | | |

FOREIGN PATENT DOCUMENTS

WO    WO 2001/051897 A1    7/2001

OTHER PUBLICATIONS

International Search Report and the Written Opinion of the International Search Authority, or the Declaration, dated May 28, 2014, PCT/US2014/017186, 13 pages, ISA/US.

*Primary Examiner* — Peter J Macchiarolo
*Assistant Examiner* — Jermaine L Jenkins
(74) *Attorney, Agent, or Firm* — Haynes and Boone, LLP

(57) ABSTRACT

Comparative image analysis is utilized to determine the flow rate of fluids, such as, for example, drilling fluid, completion fluid or hydrocarbons. As fluid flows through a conduit or open trough, a flow rate measurement device illuminates the surface of the fluid. Images of common surface features are then acquired at some time interval. Thereafter, the displacement of the common surface features in the images is analyzed to determine the flow rate of the fluid. Thus, non-contact flow rate measurements of opaque and non-opaque fluids are obtained.

21 Claims, 3 Drawing Sheets

(51) Int. Cl.
*E21B 21/08* (2006.01)
*G01F 1/66* (2006.01)

(56) References Cited

U.S. PATENT DOCUMENTS

| | | | |
|---|---|---|---|
| 7,675,029 B2* | 3/2010 | Ramstad | E21B 47/0002 |
| | | | 250/269.1 |
| 8,023,690 B2* | 9/2011 | DiFoggio | G01J 3/02 |
| | | | 382/100 |
| 8,483,445 B2* | 7/2013 | Tjhang | E21B 47/102 |
| | | | 382/109 |
| 8,525,986 B2 | 9/2013 | Dutel | |
| 9,670,775 B2* | 6/2017 | Tjhang | E21B 49/10 |
| 2005/0087001 A1 | 4/2005 | Irani | |
| 2007/0035736 A1* | 2/2007 | Vannuffelen | E21B 49/08 |
| | | | 356/432 |
| 2010/0243241 A1 | 9/2010 | Hampton et al. | |
| 2011/0157351 A1 | 6/2011 | Pollack et al. | |
| 2016/0076339 A1* | 3/2016 | Martin | E21B 47/011 |
| | | | 166/57 |

* cited by examiner

NON-CONTACT FLOW RATE MEASUREMENT OF FLUID USING SURFACE FEATURE IMAGE ANALYSIS

The present application is a U.S. National Stage patent application of International Patent Application No. PCT/US2014/017186, filed on Feb. 19, 2014, the benefit of which is claimed and the disclosure of which is incorporated herein by reference in its entirety.

FIELD OF THE DISCLOSURE

The present disclosure relates generally to flow rate measurement and, more specifically, to a device and method to determine the flow rate of fluid based upon a comparative analysis of images containing common surface features of the fluid.

BACKGROUND

In the production of hydrocarbon fluids from subterranean wells, it is common to be required to handle various fluid mixtures comprising crude oil, water and/or gas. For various reasons, it is important to determine and/or control the flow rate of the fluid from the well which delivers its production into a common manifold or flowline. For example, during circulation of drilling fluid during drilling operations, it is critical to determine and control circulation pressure to prevent various safety-related reasons.

Various systems exist in which to determine the flow rate of downhole fluids. However, conventional approaches oftentimes employ costly and bulky equipment which is expensive and consumes a great deal of space. Additionally, since the drilling fluid contains solid rock pieces and other drill cutting, it is highly viscous and, in turn, leads to erosion of downhole measurement device which are expensive and time-consuming, to replace. Moreover, since drilling fluid is often opaque, the techniques used to determine the flow rates are often overly complicated and require even more costly computing equipment and detection mechanisms.

In view of the foregoing, there is a need in the art for a non-contact and cost-effective approaches to measuring the flow rate of fluids in downhole and other environments.

DESCRIPTION OF ILLUSTRATIVE EMBODIMENTS

Illustrative embodiments and related methodologies of the present disclosure are described below as they might be employed in a flow rate measurement device and method using comparative image analysis of common features of wellbore fluid. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative embodiments of the present disclosure utilize comparative image analysis to determine the flow rate of fluids, such as, for example, drilling fluid, completion fluid, stimulation fluid, production fluids, hydraulic fracturing fluids, or hydrocarbons. In general, an illustrative flow rate measurement system includes a conduit through which the fluid flows, illumination device, image capture device, and processor. During operation, the fluid flows through the conduit whereby the surface of the fluid is illuminated by the illumination device. Once illuminated, the image capture device captures at least two images of a common surface feature of the fluid as the fluid continues to flow past the image capture device. Through an analysis of the displacement of the common surface feature between the images, the processor then determines the flow rate of the fluid. In one illustrative method, the processor quantifies the surface flow velocity and, thereafter, converts the velocity profile to the flow rate along the conduit using calibration techniques. Accordingly, non-contact flow rate measurements of fluids (opaque and non-opaque) may be obtained, thereby avoiding any of the erosion concerns and issues associated with prior art techniques.

Figure 1:
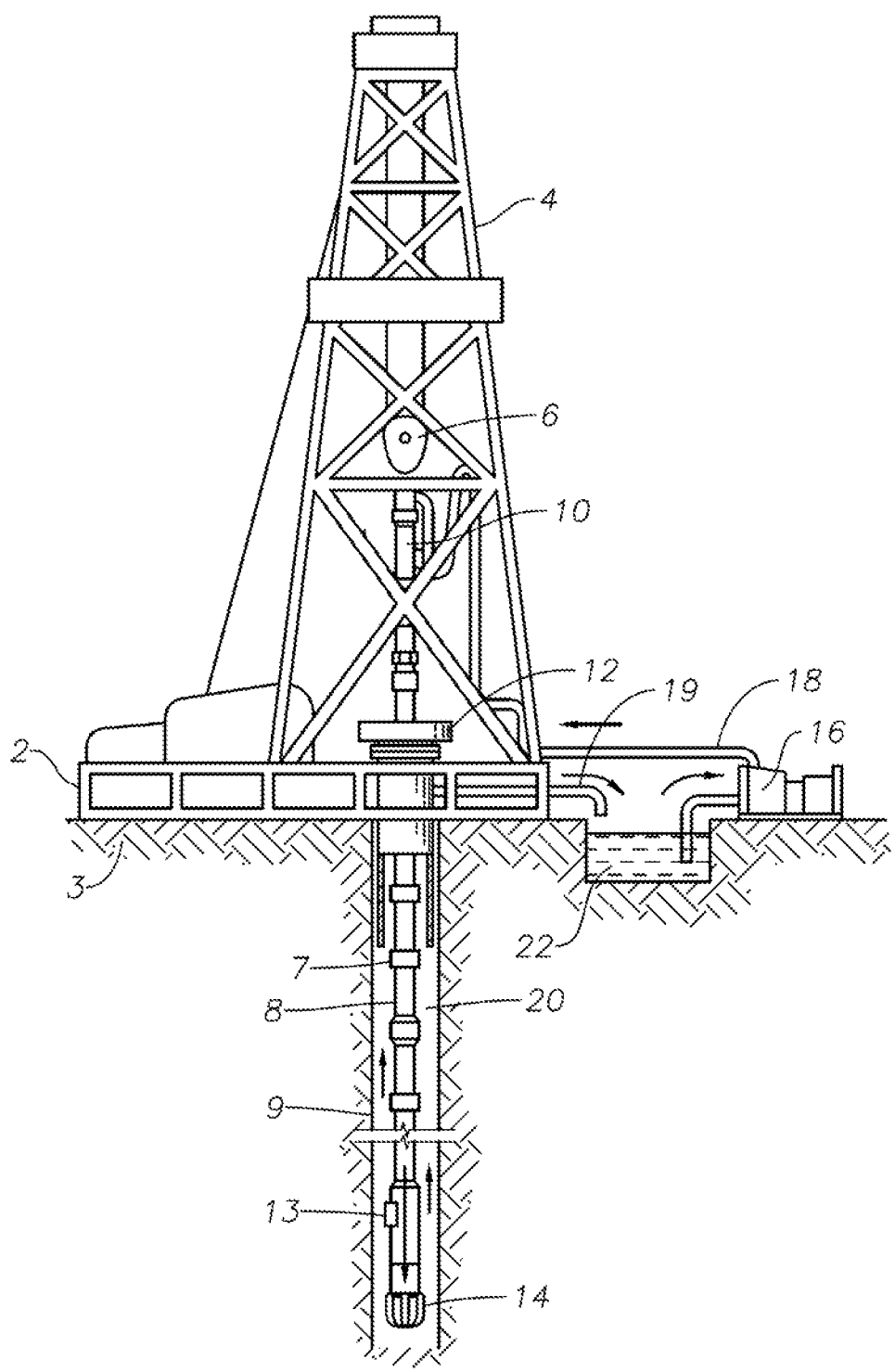
FIG. 1 illustrates a well during drilling operations, according to an illustrative embodiment of the present disclosure.

Referring now to the figures, FIG. 1 shows a well during drilling operations, according to an illustrative embodiment of the present disclosure. As shown, a drilling platform 2 rests on a formation 3 and is further equipped with a derrick 4 that supports a hoist 6. Drilling of oil and gas wells is carried out by a string of drill pipes connected together by "tool" joints 7 so as to form a drillstring 8. The drillstring 8 is surrounded by a borehole wall 9. The hoist 6 suspends a kelly 10 that is used to lower the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods.

Drilling fluid (e.g., mud) is pumped by mud recirculation equipment 16 through supply pipe 18, through drilling kelly 10, and down through drillstring 8 at high pressures and volumes to emerge through nozzles or jets in drill bit 14. The mud then travels back up the hole via an annulus 20 formed between the exterior of the drillstring 8 and borehole wall 9 and enters a mud pit 24 on the surface through return pipe 19. On the surface, the drilling mud is cleaned and then recirculated by recirculation equipment 16. The drilling mud is used, among other things, to cool drill bit 14, to carry cuttings from the base of the bore to the surface, and to balance the hydrostatic pressure in formation 3 while drilling.

Still referring to the illustrative embodiment of FIG. 1, a flow rate measurement device 13 to determine flow rates and velocity profiles of fluid can be mounted anywhere along the drillstring 8. As will be described in more detail below, in this embodiment flow rate measurement device 13 determines the flow rate of the drill mud as it flows up annulus 20. Alternatively, flow rate measurement device 13 may be positioned to instead measure the flow rate of fluid flowing down drillstring 8. In yet other alternative embodiments, flow rate measurement device 13 may be positioned at a variety of other points such as, for example, at the entry and exit points of fluid entering/exiting the wellbore, at other points along annulus 20, the casing, return pipe 19 or other downhole tubular, or at any other position along the circulation path of the fluid.

Figure 2:
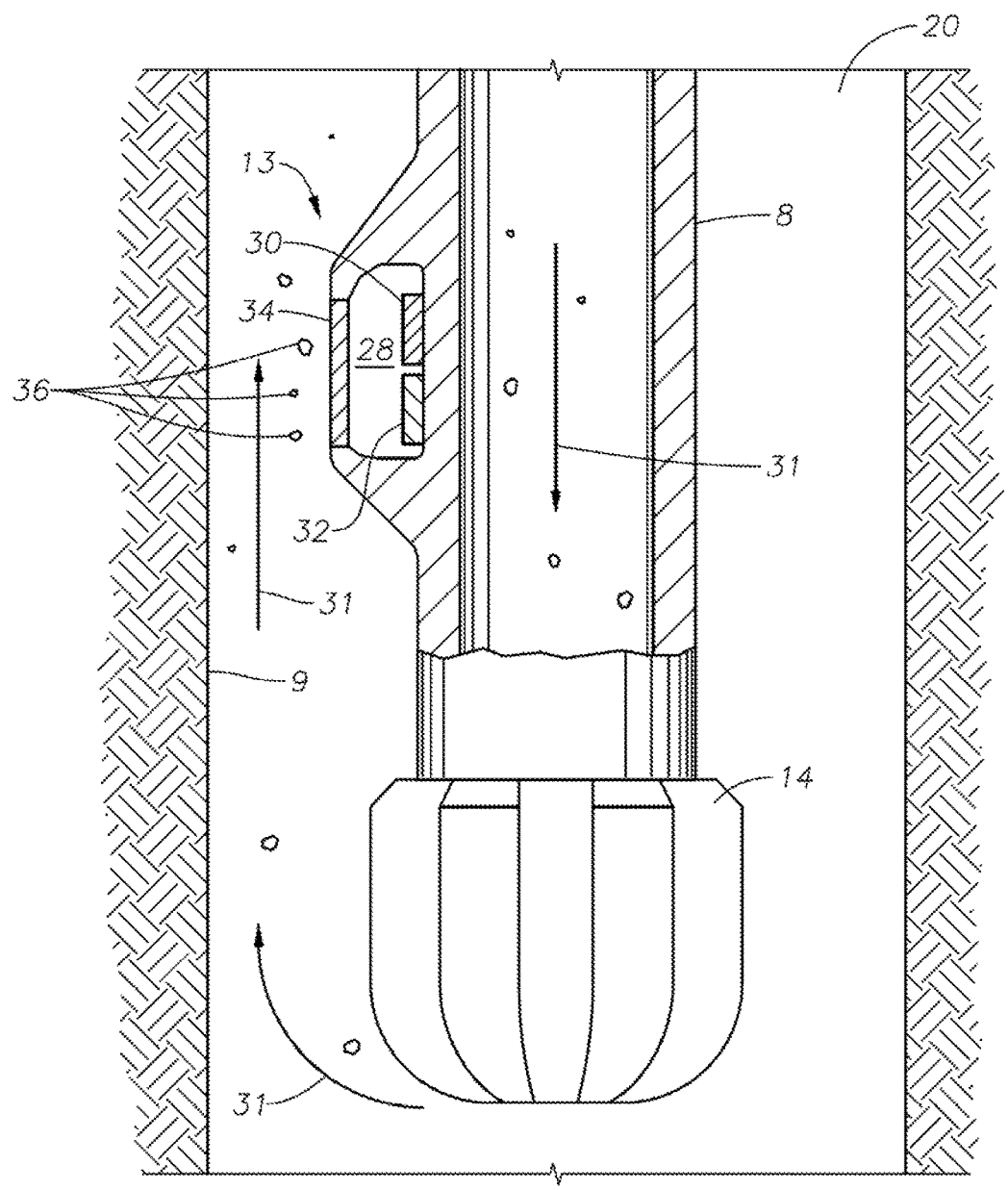
FIG. 2 is an exploded sectional view of a flow rate measurement device positioned along a drillstring, according to one illustrative embodiment of the present disclosure.

FIG. 2 is an exploded sectional view of flow rate measurement device 13 positioned along drillstring 8, according to one illustrative embodiment of the present disclosure. In this example, flow rate measurement device 13 forms an integral part of the body of drillstring 8 near bit 14. Alternatively, however, flow rate measurement device 13 may be a separate module connected to the body of drillstring 8 using some suitable means. Nevertheless, flow rate measurement device 13 includes a hollow cavity 28 which is pressure and temperature resistant. An illumination device 30 is positioned inside cavity 28 in order to illuminate the fluid (represented by arrows 31) as it flows past image capture window 34. Illumination device 30 may be a variety of powerful light sources such as, for example, a laser, spark gap, flash tube, flash bulb, LED, in addition to fluorescent, incandescent, and monochromatic devices. In other embodiments, illumination device 30 may also be a laser light source, or a light source at non-visible frequencies, such as ultraviolet light.

An image capture device 32 is also positioned inside cavity 28 in order to capture images of the illuminated fluid flowing past image capture window 34. Image capture window 34 is a transparent window, which may be made of a variety of materials, such as, for example, plastic, glass, fused silica, borosilicate, quartz or sapphire. Image capture device 32 may be a variety of high-speed cameras, such as, for example, a CCD camera, fiber optic, or CMOS device. Although not shown, flow rate measurement device 13 also includes a processor and other circuitry coupled to image capture device 32 and illumination device 30 in order to achieve the objectives of embodiments of the present disclosure. As will be described in more detail below, using images of the fluid flowing past image capture window 34, the processor analyzes the displacement of common surface characteristics to thereby determine the flow rate.

In addition, it will also be recognized that the software instructions necessary to carry out the objectives of the present disclosure may be stored within storage located in flow rate measurement device 13 or loaded into that storage from a CD-ROM or other appropriate storage media via wired or wireless methods. A communications link (not shown) may also be provide a medium of communication between the processor and some remote location (surface, for example). The communications link may be a wired link, such as, for example, a wireline or fiber optic cable extending down into the wellbore. Alternatively, however, the communications link may be a wireless link, such as, for example, an electromagnetic device of suitable frequency, or other methods including acoustic communication and like devices. In yet other embodiments, the processor may be located at some remote location, and the captured images transferred over the communications for further processing and determination of the flow rate.

Figure 3:
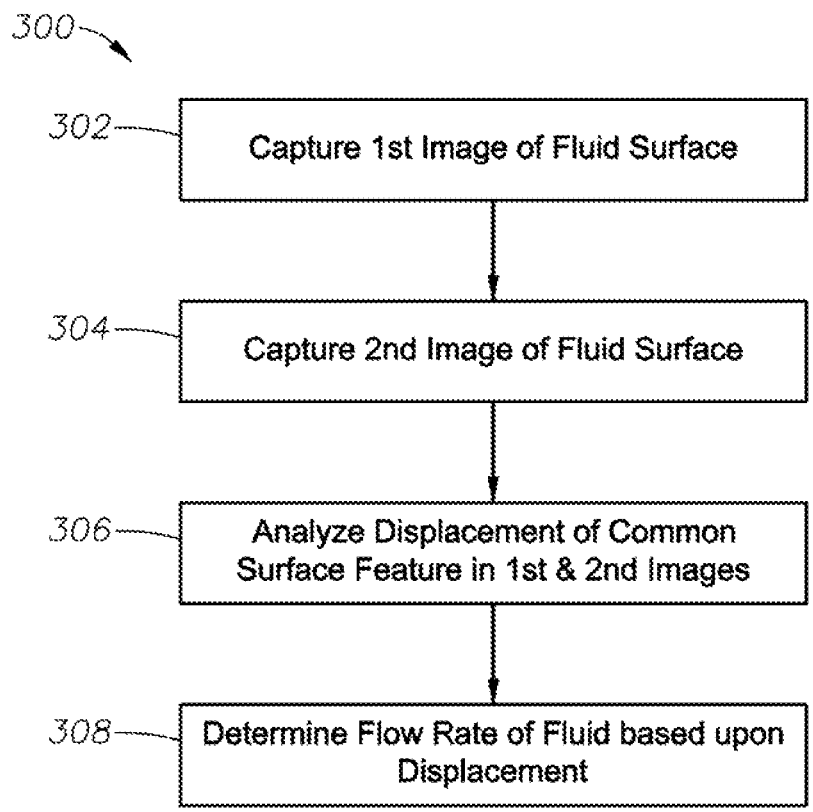
FIG. 3 is a flow chart of an illustrative flow rate measurement method performed using a flow rate measurement device of the present disclosure.

FIG. 3 is a flow chart of a flow rate measurement method 300 performed using device 13, according to an illustrative method of the present disclosure. As previously mentioned, embodiments of the present disclosure may be utilized to determine the flow rate of a variety of fluids, such as, for example, downhole fluids (e.g., drilling mud, completion fluid, etc.). The description of method 300, however, will focus on drilling fluid. With reference to FIGS. 1-3, drilling fluid 31 is first allowed to flow through a flow path (e.g., annulus 20) and past image capture window 34 during drilling operations. As fluid 31 flows past window 34, illumination device 30 is activated to thereby illuminate the surface of fluid 31 and its various surface features as they flow adjacent to image capture window 34. These surface features may take a variety of forms, such as, for example, drill cuttings, bubbles, small eddies, scale, rust, produced fines, mixed flow, or other flow features purposely introduced into the drilling fluid 31 for the purpose of flow rate determination. Since surface features are illuminated and analyzed, the flow rate may be determined for clear and opaque fluids, such as drilling mud.

At block 302, as drilling fluid 31 continues to flow, a first image of the surface (and surface features) of drilling fluid 31 is captured by image capture device 32. In high-speed fashion, a second image of the same surface feature is subsequently acquired by image capture device 32 at block 304. The time intervals between the first and second images may be programmed into device 13 as desired, such as, for example, a fraction of a second or less in certain embodiments. The first and second images are then communicated to the processor, whereby the displacement of the common surface features is analyzed, at block 306. Thereafter, at block 308, the flow rate of drill fluid 31 is determined.

Flow rate measurement device 13 may determine the flow rate of the fluid using a variety of methods. In one illustrative embodiment, using, the two-dimensional images, the processor first determines the surface flow velocity of fluid 31, and thereafter calibrates the total flow rate using the surface velocity. To determine the surface flow velocity, a variety of techniques may be used such as, for example, cross-correlation algorithms used in Particle Image Velocimetry ("PIV") whereby the two-dimensional velocity is determined. Note, however, that it is impossible to acquire the laser sheet used in traditional PIV approaches because the laser sheet cannot pass into the opaque fluid. As a result, embodiments of the present disclosure using PIV acquire common surface characteristics of the fluid, and use these images as the basis for the cross-correlation. Alternatively, a Laser Doppler vibrometer ("LDV") may also be utilized to acquire the measurements.

To achieve this in one illustrative embodiment, PIV is utilized to measure the surface velocity. As previously described, a first and second images are taken at a time interval $\Delta t$. Cross correlation is then utilized to determine the velocity inside the first and second images. Next, the cross-section of the flow channel is calibrated. For different fluids, the surface flow velocity profile is different across the cross-section, with some being parabolic and some more uniform. The surface flow velocity profile refers to the distribution of the velocities across the flow. The velocity profile can be characterized by the rate of change of the velocity with distance, the shear rate of the fluid, or the distribution of flow rates across the surface of the flow. Calibration is needed, especially when the fluid viscosity is high. Note that, by non-slip condition, there should not be any particle moving along the surface. However, the reality is, the PIV technique is measuring shallow surface next to the channel wall itself.

Figure 4:
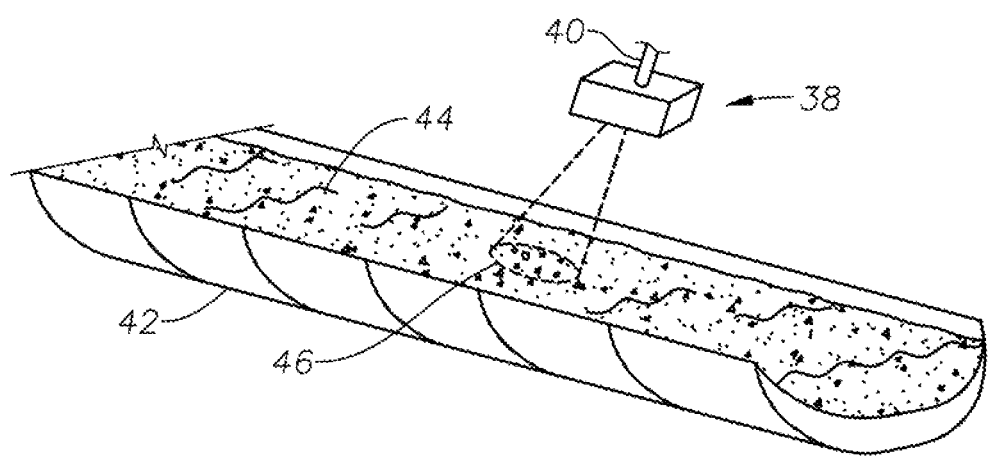
FIG. 4 illustrates a flow rate measurement device utilized to determine the flow rate of fluid along an open trough, according to alternate application of the present disclosure.

FIG. 4 illustrates a flow rate measurement device utilized to determine the flow rate of fluid along an open trough, according to alternate application of the present disclosure. Flow rate measurement device 38 is similar in design to device 13 of the previous FIGS., except that no image capture window is necessary. As such, flow rate measurement device 38 includes an image capture device, illumination device, and processing circuitry as previously described. Moreover, flow rate measurement device 38 is embodied in modular form whereby it can be suspended above an open trough 42 via some attachment mechanism 40. As fluid 44 flows along trough 42, the illumination device of device 38 illuminates the surface of fluid 44 at position 46, and the first and second images are again captured by the image capture device, and analyzed by the processor to thereby determine the flow rate of fluid 44.

Embodiments of the present disclosure may take on a variety of alterations. For example, more than two images may be captured and analyzed to thereby determine the flow rate as a function of time. Here, the flow rate measurement device may include a plurality of image capture devices positioned at various points along the flow path (e.g., conduit and/or open trough), thus essentially forming a flow rate measurement system. Thereafter, the common surface features in all the images may then be analyzed to determine the flow rate over time. In addition to downhole and open trough applications, the flow rate determination device may be positioned along transport pipeline to determine the flow of fluids (e.g., natural gas, gasoline, etc.) therethrough.

Accordingly, using the illustrative embodiments of the present disclosure, the flow rate of opaque and non-opaque fluids may be determined based upon analysis of the displacement of common surface features in the images of the fluid. Using measurements of the surface velocity, the total volume flow of the fluid may be determined. In yet other embodiments, the variation of the velocity profile at the fluid surface may also be analyzed. In such applications, the surface flow velocity profile can be combined with the depth of the fluid in order to estimate the viscosity and non-Newtonian viscosity of the fluid. The flow path may have different depths in order to achieve different shear rates in the fluid. Different shear rates allow for the characterization of the non-Newtonian viscosity of the fluid. Considering the embodiment of FIG. 4, for example, the surface flow velocity will be higher in the center of fluid 44, and slower at the edges. The surface flow velocity profile, as a result, then depends on the linear and nonlinear viscosity. In this illustrative application, flow rate measurement device 38, for example, may be retrofitted with an actuation device to move it across the width of open trough 44, whereby it scans across the surface of fluid 44. In other examples, the image capture sees the entire surface of the fluid and estimates the surface flow velocity profile based on the image. Nevertheless, as it scans, images of common surface features are captured in high-speed fashion and analyzed to determine the flow rates, which are thereafter correlated to the corresponding depth of fluid 44 to determine the surface flow velocity profile. Alternatively, the vector field (i.e., planar data of the velocity) may be utilized to determine the surface flow velocity profile, as will be understood by those ordinarily skilled in the art having the benefit of this disclosure.

In an alternate embodiment, a component of the fluid viscosity may be determined. As will be understood by those ordinarily skilled in the art having the benefit of this disclosure, viscosity is the ratio of the shear stress and the shear strain. In a Newtonian fluid, the viscosity is a constant. In non-Newtonian fluids, the viscosity is not constant but is often represented as a constant plus another term. For example, a fluid that behaves like a Bingham plastic would have a linear viscosity plus a yield stress component. Shear thinning, shear thickening, thixotropic, and rheopectic fluids are generally represented as a linear viscosity plus a nonlinear viscosity component. Therefore, in this example, the flow rate measurement device may determine the linear viscosity of the fluid or the nonlinear viscosity component.

In yet other embodiments, color variations in the common surface characteristics may also be utilized to determine the flow rate. Here, the color variations may be tracked in the same manner as are particles, flow features, etc. If the color variation (e.g., a dark bubble) follows the flow, then it will have a displacement from one image to the next, and the images can be cross-correlated, or the displacement directly measured, and knowing the time between images allows determination of the planar velocity of the dark bubble.

Embodiments described herein further relate to any one or more of the following paragraphs:

1. A flow rate measurement method to determine a flow rate of wellbore fluid, the method comprising allowing wellbore fluid to flow past an image capture device; capturing a first image of a surface of the wellbore fluid; capturing a second image of the surface of the wellbore fluid, the first and second images having a common surface feature; analyzing, a displacement of the common surface feature in the first and second images; and determining a flow rate of the wellbore fluid based on the displacement of the common feature.

2. A method as defined in paragraph 1, wherein allowing the wellbore fluid to flow comprises flowing the wellbore fluid through a conduit having an image capture window; and capturing, the first and second images comprises: illuminating the surface of the wellbore fluid flowing past the image capture window; and capturing the first and second images through the image capture window.

3. A method as defined in paragraphs 1 or 2, wherein allowing the wellbore fluid to flow comprises flowing the wellbore fluid through an open trough.

4. A method as defined in any of paragraphs 1-3, wherein determining the flow rate comprises determining a surface flow velocity of the wellbore fluid; and calculating the flow rate based upon the surface flow velocity.

5. A method as defined in any of paragraphs 1-4, wherein allowing the wellbore fluid to flow comprises allowing an opaque fluid to flow.

6. A method as defined in any of paragraphs 1-5, further comprising: capturing further images of the common surface feature; and determining the flow rate as a function of time.

7. A method as defined in any of paragraphs 1-6, further comprising determining a surface flow velocity profile.

8. A method as defined in any of paragraphs 1-7, further comprising determining a component of fluid viscosity.

9. A flow rate measurement device to determine a flow rate of fluid, the device comprising a flow path in fluid communication with a wellbore; an illumination device to illuminate a fluid flowing through the flow path; an image capture device to capture a first and second image of a common surface characteristic of the fluid; and a processor coupled to the image capture device to thereby process a displacement of the common surface characteristic in the first and second images, and thereby determine the flow rate of the fluid.

10. A device as defined in paragraph 9, wherein the flow path is a conduit, the device further comprising an image capture window positioned along the conduit through which the fluid is illuminated and the first and second images are captured.

11. A device as defined in paragraphs 9 or 10, wherein the conduit is a drill pipe or transport pipeline.

12. A device as defined in any of paragraphs 9-11, wherein the flow path is an open trough through which the fluid flows.

13. A device as defined in any of paragraphs 9-12, wherein the fluid is an opaque wellbore fluid.

14. A device as defined in any of paragraphs 9-13, wherein the common surface characteristic is at least one of a drill cutting, bubble, turbulence particle or seeded particle.

15. A flow rate measurement method to determine a flow rate of fluid, the method comprising allowing fluid to flow past an image capture device; capturing a first and second image of a common surface feature of the fluid; analyzing it displacement of the common surface feature between the first and second images; and determining a flow rate of the fluid.

16. A method as defined in paragraph 15, wherein allowing the fluid to flow comprises flowing the fluid through a conduit having an image capture window; and capturing the first and second images comprises: illuminating the common surface feature flowing past the image capture window; and capturing the first and second images through the image capture window.

17. A method as defined in paragraphs 15 or 16, wherein allowing the fluid to flow comprises flowing the fluid through an open trough.

18. A method as defined in any of paragraphs 15-17, wherein determining the flow rate comprises: determining a surface flow velocity profile of the fluid; and calculating the flow rate based upon the surface flow velocity profile.

19. A method as defined in any of paragraphs 15-18, further comprising determining a viscosity of the fluid based upon the surface flow velocity profile.

20. A method as defined in any of paragraphs 15-19, wherein allowing the fluid to flow comprises allowing an opaque fluid to flow.

21. A method as defined in any of paragraphs 1520, wherein allowing the fluid to flow comprises flowing the fluid through a flow path in fluid communication with a subterranean wellbore.

Moreover, any of the methodologies described herein may be embodied within a system comprising processing circuitry to implement any of the methods, or a in a computer-program product comprising instructions which, when executed by at least one processor, causes the processor to perform any of the methods described herein. Although various embodiments and methodologies have been shown and described, the present disclosure is not limited to such embodiments and methodologies, and will be understood to include all modifications and variations as would be apparent to one ordinarily skilled in the art. Therefore, it should be understood that the embodiments are not intended to be limited to the particular forms disclosed. Rather, the intention is to cover all modifications, equivalents and alternatives falling within the spirit and scope of the embodiments of the present disclosure as defined by the appended claims.

What is claimed is:

1. A flow rate measurement method to determine a flow rate of wellbore fluid, the method comprising:
    allowing wellbore fluid to flow through an annulus alongside a downhole tubular past an image capture device and an illumination device, wherein the image capture device and illumination device are housed in a cavity of a tool body such that images of the wellbore fluid are captured as the wellbore fluid flows through the annulus;
    using the image capture device to capture a first image of a surface of the wellbore fluid;
    using the image capture device to capture a second image of the surface of the wellbore fluid, the first and second images having a common surface feature;
    using a processor to analyze a displacement of the common surface feature in the first and second images, wherein the processor is coupled to the image capture device and illumination device;
    using the processor to determine a flow rate of the wellbore fluid based on the displacement of the common feature; and
    controlling the flow rate of the wellbore fluid based on the determined flow rate.

2. A method as defined in claim 1, wherein:
    allowing the wellbore fluid to flow comprises flowing the wellbore fluid through a conduit having an image capture window; and
    capturing the first and second images comprises:
        illuminating the surface of the wellbore fluid flowing past the image capture window; and
        capturing the first and second images through the image capture window.

3. A method as defined in claim 1, wherein allowing the wellbore fluid to flow comprises flowing the wellbore fluid through an open trough.

4. A method as defined in claim 1, wherein determining the flow rate comprises:
    determining a surface flow velocity of the wellbore fluid; and
    calculating the flow rate based upon the surface flow velocity.

5. A method as defined in claim 1, wherein allowing the wellbore fluid to flow comprises allowing an opaque fluid to flow.

6. A method as defined in claim 1, further comprising:
    capturing further images of the common surface feature; and
    determining the flow rate as a function of time.

7. A method as defined in claim 1, further comprising determining a surface flow velocity profile.

8. A method as defined in claim 7, further comprising determining a component of fluid viscosity.

9. A flow rate measurement device to determine a flow rate of fluid, the device comprising:
    a downhole drilling tool;
    a flow path in fluid communication with a wellbore;
    an illumination device to illuminate a fluid flowing through the flow path;
    an image capture device to capture a first and second image of a common surface characteristic of the fluid, wherein the image capture device and illumination device are housed in a cavity of a tool body such that images of the fluid are captured as the fluid flows through an annulus alongside the downhole tool; and
    a processor coupled to the image capture device to thereby process a displacement of the common surface characteristic in the first and second images, and thereby determine the flow rate of the fluid, wherein the processor is configured to control the flow rate of the fluid during a downhole operation.

10. A device as defined in claim 9, wherein the flow path is a conduit, the device further comprising an image capture window positioned along the conduit through which the fluid is illuminated and the first and second images are captured.

11. A device as defined in claim 10, wherein the conduit is a drill pipe or transport pipeline.

12. A device as defined in claim 9, wherein the flow path is an open trough through which the fluid flows.

13. A device as defined in claim 9, wherein the fluid is an opaque wellbore fluid.

14. A device as defined in claim 9, wherein the common surface characteristic is at least one of a drill cutting, bubble, turbulence particle or seeded particle.

15. A flow rate measurement method to determine a flow rate of fluid, the method comprising:
 allowing wellbore fluid to flow through an annulus alongside a downhole tool past an image capture device and an illumination device, wherein the image capture device and illumination device are housed in a cavity of a tool such that images of the wellbore fluid are captured as the wellbore fluid flows through the annulus;
 using the image capture device to capture a first and second image of a common surface feature of the fluid;
 using a processor to analyze a displacement of the common surface feature between the first and second images, wherein the processor is coupled to the image capture device and illumination device;
 using the processor to determine a flow rate of the fluid; and
 controlling the flow rate of the fluid during a downhole operation based on the determined flow rate.

16. A method as defined in claim 15, wherein:
 allowing the fluid to flow comprises flowing the fluid through a conduit having an image capture window; and
 capturing the first and second images comprises:
 illuminating the common surface feature flowing past the image capture window; and
 capturing the first and second images through the image capture window.

17. A method as defined in claim 15, wherein allowing the fluid to flow comprises flowing the fluid through an open trough.

18. A method as defined in claim 15, wherein determining the flow rate comprises:
 determining a surface flow velocity profile of the fluid; and
 calculating the flow rate based upon the surface flow velocity profile.

19. A method as defined in claim 18, further comprising determining a viscosity of the fluid based upon the surface flow velocity profile.

20. A method as defined in claim 15, wherein allowing the fluid to flow comprises allowing an opaque fluid to flow.

21. A method as defined in claim 15, wherein allowing the fluid to flow comprises flowing the fluid through a flow path in fluid communication with a subterranean wellbore.

* * * * *